July 31, 1962

B. BURLEY 3,046,743

HYDRAULIC ACTUATOR

Filed July 13, 1961

INVENTOR
BILLY BURLEY

BY Scrivener & Parker

ATTORNEYS

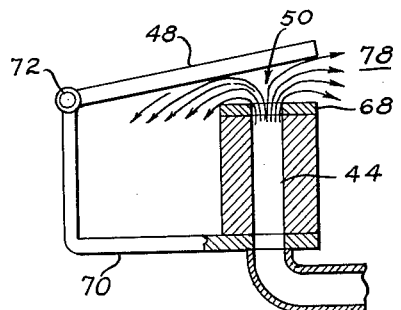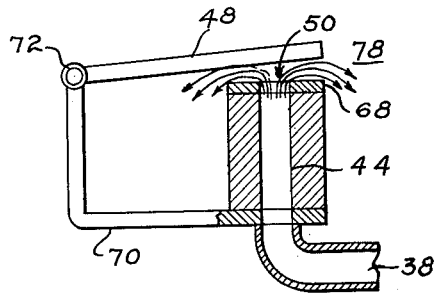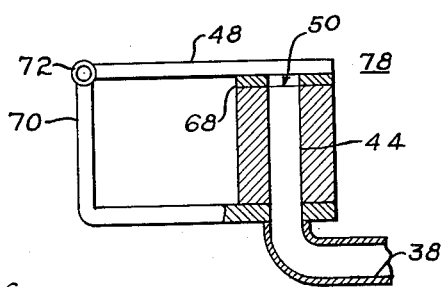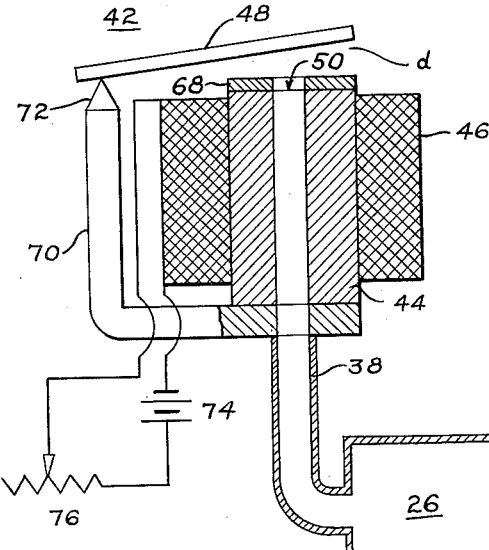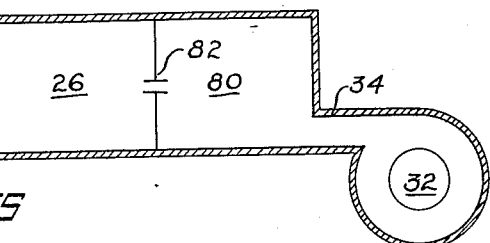

United States Patent Office 3,046,743
Patented July 31, 1962

3,046,743
HYDRAULIC ACTUATOR
Billy Burley, Dallas, Tex., assignor to Fischbach and Moore, Inc., New York, N.Y., a corporation of New York
Filed July 13, 1961, Ser. No. 123,809
9 Claims. (Cl. 60—52)

This invention relates to hydraulic actuators and more particularly to hydraulic actuators for longitudinally positioning a shaft.

A primary object of this invention is to provide a hydraulic actuator having a novel self-contained, closed-circuit hydraulic system which is not affected by the position in which the actuator is mounted with respect to gravitational forces.

Another object of this invention is to provide a hydraulic actuator for longitudinally positioning a shaft having novel fail-safe means for automatically retracting the shaft to a predetermined position in the event of a power failure.

Still another object of this invention is to provide a hydraulic actuator for longitudinally positioning a shaft having a novel self-contained, multiple-chamber, closed-circuit hydraulic system with a novel variable flow restricting means therein between selected chambers for producing the desired control pressure therein.

These and other objects of this invention will become apparent with reference to the following specification and drawings which relate to several preferred embodiments of the invention.

In the drawings:

FIG. 2 is an operational view of a detail of FIG. 1;

FIG. 3 is a further operational view of FIG. 2;

FIG. 4 is yet a further operational view of FIG. 2; and

FIG. 5 is a schematic additional embodiment of a detail of FIG. 1.

Figure 1:
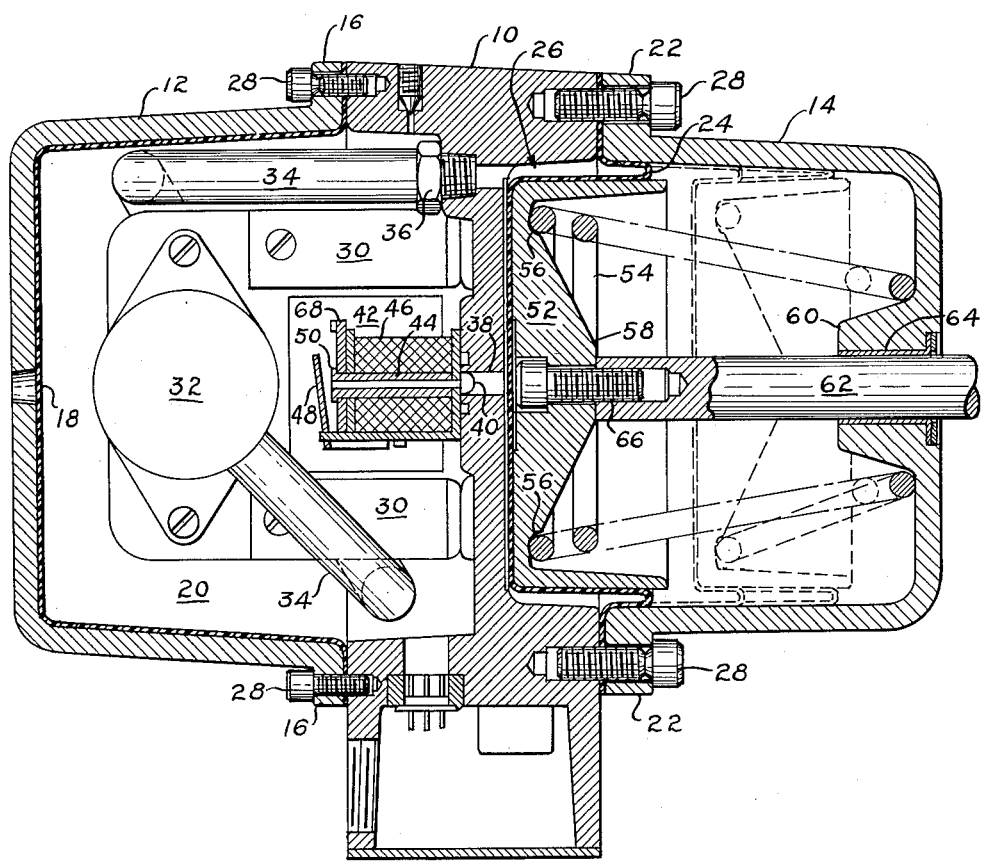
FIG. 1 is a cross sectional view of the entire hydraulic actuator.

Primarily, the invention comprises a motor-pump unit enclosed in one of a pair of expansible chambers wherein the total volume of fluid enclosed by both remains constant. The motor-pump unit is in a closed hydraulic circuit connecting the two variable volume fluid chambers and supplies the pressure to pump fluid from the first chamber to the other and back into the first chamber through a selectively variable flow restrictor whereby the operating pressure in the second chamber may be selectively controlled. The expansion of the second chamber is opposed by a biasing force such as that supplied by a spring, whereby a shaft or the like properly coupled to a moving portion of the second chamber may be driven to a given position in response to a preselected operating pressure in the said second chamber as determined by the adjustment of the selectively variable flow restrictor.

Referring in detail to the drawings and more particularly to FIGURE 1, the invention is shown as comprising an outer housing having a centrally disposed internal wall 10 with a pair of flanged chamber defining bell-shaped housings 12 and 14 mounted on opposite faces thereof.

The first bell-shaped housing 12, by way of the flanged portion 16 thereon encloses and secures to the central wall member 10 a first flexible bag member 18 which defines a first variable volume fluid chamber 20 between the said bag 18 and the chamber wall 10.

On the opposite side of the central wall 10, the second bell-shaped housing 14, by way of the flanged portion 22 thereon encloses and secures to the central wall member 10 a second flexible bag 24 which defines a second variable volume fluid chamber 26 between the said second bag 24 and the central wall 10.

Both of the flanges 16 and 22 are secured to the central wall member 10 by a plurality of bolts 28 or the like.

Mounted on a bracket 30 within the first fluid chamber 20 is a constant volume motor-pump unit 32 which takes in fluid from the chamber 20 through a suction port (not shown) and discharges fluid through a flexible output line 34 through a threaded nipple connection 36 extending through the central wall 10 into the second fluid chamber 26. This constitutes the forward path of the closed hydraulic circuit in which the motor-pump 32 operates.

The return path of the hydraulic circuit from the second chamber 26 to the first chamber 20 comprises a centrally disposed fluid return vent 38 in the central wall member 10 having a filter screen 40 therein for preventing foreign matter from recirculating to the suction side of the motor-pump 32. Coaxially extended from the return vent 38 within the first chamber 20 is a selectively variable flow restrictor generally indicated at 42 comprising a flow tube 44 extending from said return vent 38 internally concentric with a solenoid coil 46 which controls a moving flap-shaped armature 48 to move toward or away from the adjacent outlet end 50 of the flow tube 44 and thereby variably restrict the return flow of fluid therethrough. The restrictor flap 48 varies the resistance to the flow of fluid from the second chamber 26 to the first chamber 20 in inverse proportion to the square of the mean distance between the flap 44 and the outlet end 50 of the flow tube 44. This relationship will be further described in detail at a later point herein.

Expansion of the second flexible bag 24, in response to an increase in pressure therein as created by the action of the variable flow restrictor 42, is opposed by a large surface area, flat-headed piston 52 which is biased against the second bag 24 by the action of a helical spring 54 having a truncated conical cross-section and mounted in compression between a symmetrically disposed receiving socket 56 on the underside 58 of the piston 52 and a truncated conical bearing stub 60 symmetrically and internally disposed on the end wall of the second bell housing 14.

An actuator shaft 62, the longitudinally extended position of which is controlled by the force of the expanding second flexible bag member 24 acting against the force of the spring 54 and the piston 52, is concentrically journalled through the end wall of the second housing 14 in a bearing sleeve 64 extending through the bearing stub 60. Forward and retractive driving force is applied to the actuator shaft 62 by means of a bolted connection 66 between the piston 52 and the inner end of the shaft.

*The Variable Flow Restrictor*

Referring now to FIGURES 2, 3 and 4, the operation and theoretical considerations of the selectively variable flow restrictor 42 will now be described.

The movable flow restrictor flap 48 is, in actuality, the armature of an electromagnet having the fluid flow tube 44 as the core thereof with a flat, disc-shaped pole piece 68 mounted on the outlet end 50 of the flow tube 44. The solenoid coil 46 supplies the necessary magnetic flux for the operation of the flow restrictor 42. The magnetic circuit is completed from the flow tube 44 through the L-shaped bracket 70 of suitable magnetic material, the hinge 72 thereon for mounting the movable flap 48, and finally through the flap 48 and the air gap $d$ (FIGURE 5) between the armature 48 and the pole piece 68 back to the flow tube 24.

Referring now to FIGURE 5, the solenoid coil 46 is energized from a power source 74 through a rheostat 76 or the like whereby the attractive force between the armature 48 and the pole piece 68 across the air gap $d$ may be selectively varied to oppose the flow of fluid generally shown at 78 in FIGURES 2, 3 and 4 in varying degrees. The magnetic force MF generated is expressed as an inverse proportion of the square of the airgap $d$ multiplied by a constant K which is a function of the parameters of the particular combined solenoid structure. This relationship is best described by the equation:

$$MF = K/d^2$$

Thus, the smaller the air gap is to become, the greater the magnetic force which must be applied to overcome the force of the fluid flow 78 which is being forced through the flow tube 24 by the action of the motor-pump 32 acting always to approach a constant volume of flow. This interaction between the fluid flow 78 and the magnetic force MF on the armature flap 48, assuming that instantaneously the second fluid chamber 26 remains at a fixed volume, creates a variable back pressure in the second chamber 26 directly proportional to the magnitude of the magnetic force MF since the pressure must increase in response to the tendency of the motor-pump 32 to pump a constant volume of fluid through the hydraulic circuit. This pressure, consequently, acts over the area of the flexible bag 24 to generate a force against the spring 54 through the piston 52 to move the piston in the chamber to a position where the pressure force and the spring force are in equilibrium.

Self-Regulator

As schematically shown in FIGURE 5, a self-regulating device may be effected by placing an additional fluid reservoir 80 having fixed volume in the line 34 between the pump 32 and the second chamber 26, which feeds the second chamber 26 through a fixed size restricted orifice 82, which is smaller in diameter than the return vent 38.

Two primary advantages are derived from this embodiment. First, during a period in which the air gap $d$ is permitted to achieve a maximum predetermined open position, the orifice 82 restricts the flow of fluid to the second chamber 26 from the pump 34 in an amount sufficient to achieve virtually a zero pressure in the second chamber 26. Thus, the pressure response of the second chamber 26 is made substantially linear with the variation in the magnetic force applied to the variable flow restrictor 42. Second, in the case of an increase or decrease fluctuation in the supply pressure, a smooth controlled response due to the small size of the orifice 82 will permit a corresponding increase in the flow therethrough to the second chamber 26 causing a temporary increase or decrease in the force exerted by the fluid through the return vent 38 and flow tube 44 against the armature flap 48. For a given setting of magnetic force, the change in the force of fluid flow will change the dimensions of the air gap $d$ in a direction such that the desired pressure is maintained in the second chamber 26. Thus, the force exerted by the second flexible bag 24 on the spring 54 through the piston 52 will remain constant and the prescribed position of the actuator shaft 62 will remain fixed.

Operation

Referring now to FIG. 1, since the expansion of the second flexible bag 24 is controlled by the piston 52 and spring 54 and the total volume of fluid in the first and second fluid chambers 20 and 26 defined by the first and second flexible bag members 18 and 24, respectively, remains constant, the first bag 18 will contract from the action of the suction of pump 32 in an amount corresponding to the expansion of the second bag 24 in response to an increase in back pressure therein. Thus, regardless of the position of the entire actuator assembly, the first bag 18 maintains the motor-pump unit 32 completely submerged in operating fluid for maximum operational efficiency.

When the rheostat 76 is selectively adjusted to a particular setting calibrated to a piven position of the actuator shaft 62, a corresponding magnetic flux is generated in the solenoid coil 46 of the variable flow restrictor 42 and a magnetic force of corresponding magnitude is applied to the armature flap 44.

Since the motor-pump unit has been previously energized, the armature flap 44 moves toward or away from the outlet end 50 of the flow tube 44 in opposition to the fluid flow 78 in the fluid return vent 38 and creates a corresponding back-pressure in the second chamber 26. Thus, the second bag 24 expands in opposition to the spring 54 whereby the piston 52 and the actuator shaft 62 are indexed to a new position of equilibrium.

In the case of a power failure of the flow restrictor or the motor-pump unit, the opposing force of the spring 54 forces all of the operating fluid out of the second chamber 26 into the first chamber 20 through flow restrictor 42 in case of power failure of the flow restrictor or through the pump unit 32 in the case of a motor power failure, whereby the second bag 24 collapses to force all of the operating fluid out of the second chamber 26 into the first chamber 20 and permits the piston 52 and actuator shaft 62 to be driven to their innermost or "fail-safe" position.

As can be seen from the foregoing description this invention provides a universally mountable, self-regulating, positive acting and automatically fail-safe responsive hydraulic actuator having a novel closed hydraulic circuit and variable flow restrictor incorporated therein.

It is to be understood that the embodiment shown and described herein is for the purpose of example only and is not intended to limit the scope of the appended claims.

What is claimed is:

1. In a hydraulic actuator first and second variable volume fluid chambers defined by first and second flexible bag members, respectively, the combined volume of the two said chambers remaining constant and being filled with hydraulic fluid, and pump means in said first chamber having a suction port in communication with said first chamber and an outlet port in communication with said second chamber for pumping said fluid from said first into said second chamber to expand said second flexible bag and contract said first flexible bag around said pump to maintain said pump completely submerged in hydraulic fluid, whereby said actuator may be mounted in any desired position without impairing the action of said pump.

2. In a hydraulic actuator first and second variable volume fluid chambers defined by first and second flexible bag members, respectively, the combined volume of the two said chambers remaining constant and being filled with hydraulic fluid, pump means in said first chamber having a suction port in communication with said first chamber and an outlet port in communication with said second chamber for pumping said fluid from said first into said second chamber to expand said second flexible bag and contract said first flexible bag around said pump completely submerged in hydraulic fluid, whereby said actuator may be mounted in any desired position without impairing the action of said pump, equalizing means for opposing the expansion of said second flexible bag and a fluid return vent from said second chamber to said first chamber having a selectively variable fluid flow restricting means therewith, whereby driving said pump at a constant rate and variably restricting the return flow of hydraulic fluid from said second chamber to said first chamber creates a back pressure in said second chamber causing said second bag to expand a given amount against the opposing force of said equalizing means.

3. The invention defined in claim 2 wherein each of said first and second flexible bags are enclosed between first and second housings, respectively and a common intermediate wall including said pump outlet port and said fluid return vent, and said equalizing means comprises a piston in said second housing in contact with said second bag and a compression spring between said piston and a wall of said second housing, said spring being calibrated to apply a given force by way of said piston to said second bag in opposition to the expansion thereof in response to a predetermined pressure.

4. The invention defined in claim 2 wherein said selectively variable flow restrictor comprises a flow tube of magnetic material extending from said return vent into said first chamber, a pivotally mounted magnetically energized flap shaped armature member adjacent to and across the outlet end of said flow tube and selectively positioned from a maximum distance away from said outlet end to a position in which said flow tube outlet is substantially closed, and a solenoid coil surrounding said flow tube and selectively energized to magnetically attract said armature flap with a magnetic force sufficient to oppose the return flow of hydraulic fluid through said flow tube such that a predetermined magnetic force will position said armature flap at a predetermined position.

5. The invention defined in claim 4 comprising in addition an additional constant volume fluid chamber between said pump outlet and said second chamber, said additional chamber being connected with said second chamber by a restricted orifice having a smaller flow capacity than said fluid return vent, whereby said second chamber is permitted to empty into said first chamber at a rate to effect substantially zero pressure therein when the variable flow restrictor armature flap is set for maximum flow and to effect a regulating action against said armature flap set by a given magnetic force to provide a controlled increase or decrease in flow in said second chamber in case of a variation of fluid flow from said additional chamber to reposition said flap and maintain the back pressure effected thereby in said second chamber at a constant predetermined value.

6. A hydraulic actuator, for longitudinally positioning a shaft to a predetermined position, comprising first and second variable volume fluid chambers defined by first and second flexible bag members, respectively, the combined volume of the two said chambers remaining constant and being filled with hydraulic fluid, pump means in said first chamber having a suction port in communication with said first chamber and an outlet port in communication with said second chamber for pumping said fluid from said first into said second chamber to expand said second flexible bag and contract said first flexible bag around said pump completely submerged in hydraulic fluid, whereby said actuator may be mounted in any desired position without impairing the action of said pump, equalizing means for opposing the expansion of said second flexible bag and a fluid return vent from said second chamber to said first chamber having a selectively variable fluid flow restricting means therewith, whereby driving said pump at a constant rate and variably restricting the return flow of hydraulic fluid from said second chamber to said first chamber creates a back pressure in said second chamber causing said second bag to expand a given amount against the opposing force of said equalizing means, said equalizing means being mounted such that a predetermined pressure in said second chamber causes said flexible bag to expand and move said equalizing means a predetermined distance, and coupling means between said equalizing means and said shaft, whereby the movement of said equalizing means is converted to a longitudinal movement of said shaft to a position corresponding to said predetermined pressure in said second chamber.

7. The invention defined in claim 6 wherein each of said first and second flexible bags are enclosed between first and second housings, respectively and a common intermediate wall including said pump outlet port and said fluid return vent, and said equalizing means comprises a piston in said second housing in contact with said second bag and a compression spring between said piston and a wall of said second housing, said spring being calibrated to apply a given force by way of said piston to said second bag in opposition to the expansion thereof in response to a predetermined pressure.

8. The invention defined in claim 6 wherein said selectively variable flow restrictor comprises a flow tube of magnetic material extending from said return vent into said first chamber, a pivotally mounted magnetically energized flap shaped armature member adjacent to and across the outlet end of said flow tube and selectively positioned from a maximum distance away from said outlet end to a position in which said flow tube outlet is substantially closed, and a solenoid coil surrounding said flow tube and selectively energized to magnetically attract said armature flap with a magnetic force sufficient to oppose the return flow of hydraulic fluid through said flow tube such that a predetermined magnetic force will position said armature flap at a predetermined position.

9. The invention defined in claim 8 comprising in addition an additional constant volume fluid chamber between said pump outlet and said second chamber, said additional chamber being connected with said second chamber by a restricted orifice having a smaller flow capacity than said fluid return vent, whereby said second chamber is permitted to empty into said first chamber at a rate to effect substantially zero pressure therein when the variable flow restrictor armature flap is set for maximum flow and to effect a regulating action against said armature flap set by a given magnetic force to provide a controlled increase or decrease in flow in said second chamber in case of a variation of fluid flow from said additional chamber to reposition said flap and maintain the back pressure effected thereby in said second chamber at a constant predetermined value.

References Cited in the file of this patent
UNITED STATES PATENTS

| | | |
|---|---|---|
| 2,671,317 | Heintzelman | Mar. 9, 1954 |
| 2,934,900 | Robinson | May 3, 1960 |
| 2,948,118 | Carlson et al. | Aug. 9, 1960 |